United States Patent [19]

Lake, Jr.

[11] Patent Number: 4,831,447

[45] Date of Patent: May 16, 1989

[54] METHOD AND APPARATUS FOR ANTI-ALIASING AN IMAGE BOUNDARY DURING VIDEO SPECIAL EFFECTS

[75] Inventor: David E. Lake, Jr., Penn Valley, Calif.

[73] Assignee: The Grass Valley Group, Inc., Grass Valley, Calif.

[21] Appl. No.: 121,375

[22] Filed: Nov. 16, 1987

[51] Int. Cl.[4] .............................................. H04N 5/262
[52] U.S. Cl. ..................................... 358/183; 358/182; 358/22; 382/46; 340/727; 340/730; 364/521
[58] Field of Search .................. 358/183, 22, 160, 280, 358/182; 382/46, 54; 340/727, 728, 730; 364/521

[56] References Cited

U.S. PATENT DOCUMENTS

| | | | |
|---|---|---|---|
| 4,041,527 | 8/1977 | Rayner et al. | 358/22 |
| 4,109,278 | 8/1978 | Mendrala et al. | 358/22 |
| 4,409,611 | 10/1983 | Vlahos | 358/22 |
| 4,621,280 | 11/1986 | Shinohara et al. | 358/22 |
| 4,687,681 | 8/1987 | Jackson | 358/183 |
| 4,689,682 | 8/1987 | Jackson | 358/183 |
| 4,698,666 | 10/1987 | Lake, Jr. et al. | 358/183 |
| 4,698,682 | 10/1987 | Astle | 358/22 |

Primary Examiner—James J. Goody
Assistant Examiner—John K. Peng
Attorney, Agent, or Firm—John Smith-Hill; Francis I. Gray

[57] ABSTRACT

A method of processing a foreground array of sample values, a background array of sample values and a crop array of sample values, which three arrays are coextensive and wherein the crop array represents a geometrical figure associated with a non-zero multiplication factor surrounded by a marginal area associated with a zero multiplication factor, comprises selecting a low-pass filtering operation to be carried out on the foreground array, and modifying the crop array so that when the selected low-pass filtering operation is carried out on the modified crop array, the sample values at the periphery of the domain of the resulting filtered crop array are all associated with a zero multiplication factor. The selected low-pass filtering operation is carried out on the foreground array and the modified crop array to provide a filtered foreground array and a filtered crop array respectively. The background array and the filtered foreground array are combined under control of the filtered crop array.

7 Claims, 3 Drawing Sheets

METHOD AND APPARATUS FOR ANTI-ALIASING AN IMAGE BOUNDARY DURING VIDEO SPECIAL EFFECTS

BACKGROUND OF THE INVENTION

This invention relates to a method and apparatus for anti-aliasing an image boundary during video special effects, particularly in order to improve the outline of an image created by digital video coordinate transformation effects.

In a video special effects apparatus a first scene, for example as shown in FIG. 1(a), may be used to occlude part of a second scene (FIG. 1(b)), so that a composite scene (FIG. 1(c)) is generated in which the first scene appears as a foreground against a background of the second scene. In a known digital video effects apparatus, this is accomplished by using a foreground video signal representing the first scene to provide a first rectangular array of digital values and a background video signal representing the second scene to provide a second rectangular array of digital values. A crop signal is used to provide a third two-dimensional array of values. The three arrays of digital values exist in mutually coextensive domains, corresponding to the active area of a video frame, and the sampling intervals for the three arrays are the same. Thus, for each element of one array there are corresponding elements in the other arrays. The crop signal is used to control combination of the first and second arrays. In particular, each element of the crop array is multiplied by the corresponding element of the foreground array and its complement is multiplied by the corresponding element of the background array, and the two resulting elements are added together. Over most of the frame, the crop signal has one of two values, corresponding to a multiplication factor of one and a multiplication factor of zero respectively. Thus, the crop signal represents a geometrical figure whose periphery defines the boundary in the composite scene between the foreground and the background.

Both the foreground and background video signals are bandwidth-limited in order to avoid aliasing when the array which results from combining the foreground and background arrays is used to reconstruct a video signal representing the composite scene.

In a conventional digital video effects apparatus, the crop signal is processed in identical fashion to the foreground video signal. This ensures that if, for example, the first scene is rotated, translated or compressed, the figure defined by the crop signal is rotated, translated or compressed in identical fashion.

When the first scene is compressed, so that an object of the foreground occupies a reduced area in the composite scene, "jaggies", which are caused by aliasing, are sometimes observed in the composite scene along the boundary between the foreground and the background, even though the foreground signal has been filtered to take account of the increase in bandwidth that results from spatial compression.

SUMMARY OF THE INVENTION

Since the crop signal is processed in identical fashion to the foreground signal, when the first scene is compressed, the crop signal is filtered. If the periphery of the figure represented by the crop signal is close to the edge of the domain of the crop signal, the filtered crop signal is truncated. High-frequency components are thereby introduced into the filtered crop signal. When the filtered crop signal and its complement are multiplied by the foreground signal and the background signal, high-frequency components are introduced into the resulting signals, and on reconstruction these high-frequency components alias and cause the jaggies at the boundary of the foreground.

A preferred embodiment of the invention in its first aspect is a method of processing a foreground array of sample values, a background array of sample values and a crop array of sample values, which three arrays are coextensive and wherein the crop array represents a geometrical figure associated with a non-zero multiplication factor surrounded by a marginal area associated with a zero multiplication factor. The method comprises selecting a low-pass filtering operation to be carried out on the foreground array, and modifying the crop array so that when the selected low-pass filtering operation is carried out on the modified crop array, the sample values at the periphery of the domain of the resulting filtered crop array are all associated with a zero multiplication factor. The selected low-pass filtering operation is carried out on the foreground array and the modified crop array to provide a filtered foreground array and a filtered crop array respectively. The background array and the filtered foreground array are combined under control of the filtered crop array.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1A:
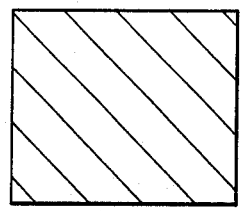
FIG. 1a–1e illustrates how two scenes may be combined using a video special effects apparatus.
Figure 2:
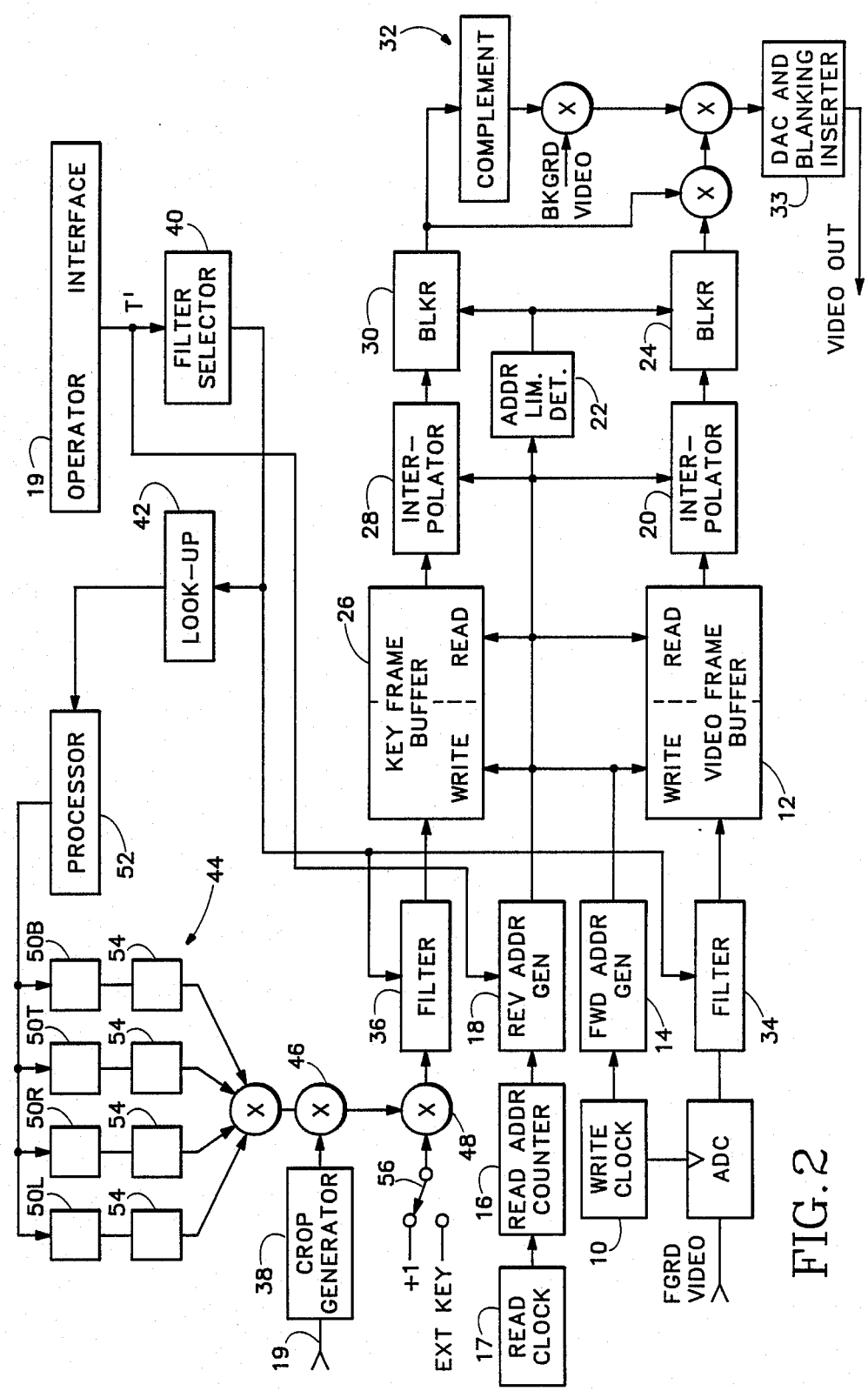
FIG. 2 is a block diagram of a special effects apparatus embodying the invention.

The special effects apparatus shown in FIG. 2 operates by digitizing a foreground video signal representing a first scene (FIG. 1(a)) under control of a write clock 10 and writing the resulting sequence of digital words, each having, e.g. ten bits, into a video frame buffer 12 using addresses generated by a forward address generator 14. The foreground signal is in component form and is derived from an analog composite video signal, e.g. in NTSC format, by separating it into its components (normally luminance and chrominance) and digitizing each component. The frame buffer 12 comprises a memory for storing the luminance component and a memory for storing the chrominance components. However, since the components are acted on in like manner in the special effects apparatus, it is not necessary to consider the components separately.

The horizontal and vertical blanking intervals of the foreground signal are not digitized. Seven hundred twenty samples are taken during the active interval of each of the 480 active lines of each frame of the foreground signal. Thus, the operation of digitizing the foreground signal effectively resolves the first scene into a rectangular array of 720×480 pixels. The location of a pixel in the scene can be defined by a two-coordinate display address (U, V) of the first scene. The address space of the video frame buffer is organized so that there is one-to-one correspondence between the display addresses and the memory addresses generated by the forward address generator 14. Thus, the digital word representing the pixel having the foreground scene display address (U, V) is written into the frame buffer 12 at a location that has a memory address which can be expressed as (U, V).

Figure 1B:
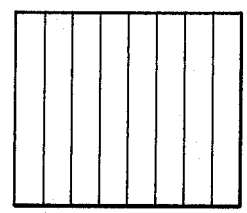
Figure 1C:
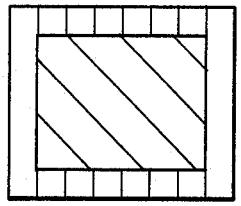
Figure 1D:
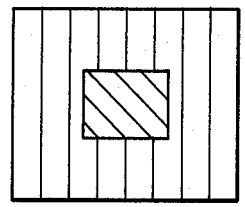

In order to read an output video signal from the frame buffer 12, a read address counter 16 operates under control of a read clock 17 to generate a sequence of output scene display addresses (X, Y) defining the locations in the composite scene (FIG. 1(c)) of the pixels that will be successively addressed. The coordinate values X and Y each have the same number of significant digits as the coordinate values U and V respectively. Accordingly, the display addresses (X, Y) define the same possible pixel positions in the output display space as are defined in the input display space by the display addresses (U, V). However, the display addresses (X, Y) are not used directly to read the output video signal from the frame buffer. A reverse address generator 18 receives the output scene display addresses (X, Y) and multiplies them by a transform matrix T' to generate corresponding memory addresses (X', Y') which are used to read the video signal from the frame buffer. The transform matrix T' is applied to the reverse address generator 18 by a user interface 19, and defines the nature of the transform which is effected by the reverse transform system. If, for example, it is desired to effect a transformation in which the input scene is displaced diagonally upwards and to the left by an amount equal to the inter-pixel pitch in the diagonal direction, the transform matrix would be such that the memory address (X', Y') that is generated in response to the display address (X, Y) would be (X+1, Y+1), assuming that the origin of the coordinate system is in the upper left corner of the input and output scene and values of X and Y increase to the right and downwards respectively.

In the general case, it is not sufficient for the values of X' and Y' to be related to X and Y by addition or subtraction of integers, and therefore the memory address coordinates X' and Y' have more significant digits than the display address coordinates X and Y. The reverse addresses are applied not only to the frame buffer 12 but also to a video interpolator 20. For each reverse address (X', Y'), the frame buffer outputs the respective digital words representing an array of pixels surrounding the position defined by the reverse address (X', Y'). For example, the data words representing the four pixels nearest the point defined by the address (X', Y') might be provided. These four data words are applied to the interpolator 20, and the interpolator combines these four digital words into a single digital output word based on the fractional portion of the address (X', Y'). For example, using decimal notation, if the least significant digit of each coordinate X and Y is unity but the least significant digit of the coordinates X' and Y' is one-tenth, and the counter 16 generates the read address (23, 6) which is converted to a reverse address (56.3, 19.8) by being multiplied by the transform matrix T', the frame buffer 12 might respond to the reverse address (56.3, 19.8) by providing the digital words stored at the addresses (56, 19), (56, 20), (57, 19) and (57, 20). The interpolator 20 combines these four words into a single digital output word by weighting them 3:7 in the horizontal direction and 8:2 in the vertical direction. This digital word defines the value that is to be generated at the location of the output screen that is defined by the display address (23, 6).

The range of possible reverse addresses is greater than the range of memory addresses defining locations in the frame buffer 12, so that a validly-generated reverse address might define a location that does not exist in the frame buffer's address space. Therefore, the reverse addresses are also applied to an address limit detector 22 which responds to an invalid reverse address (an address which defines a location outside the address space of the frame buffer 12) by providing a signal which causes a video blanker 24 to inhibit the output signal of the frame buffer.

The foreground video signal applied to the video frame buffer 12 is subject to a two-dimensional digital filtering operation in a filter 34 in order to ensure that the vertical and horizontal spatial frequencies of the output signal provided by the blanker 24 are no more than half the spatial sampling frequencies in the vertical and horizontal directions respectively. It will be understood that a digital filtering operation is carried out by storing an array of sample values and forming a weighted sum of the sample values, and that relationships among the weighting coefficients determine the nature of the filtering operation.

In parallel with the video channel comprising the video frame buffer 12, the video interpolator 20 and the video blanker 24 is a key channel comprising a key frame buffer 26, a key interpolator 28 and a key blanker 30. A digital crop signal which is synchronous with the digitized foreground signal is applied to the key channel and an array of 720×480 crop values is stored in the key frame buffer. Each value of the crop signal, which has 10 bits, represents a multiplcation factor. A crop signal value of decimal 0 represents a multiplication factor of zero, and a crop signal value of 1024 represents a multiplication factor of one. The crop signal is processed in the key channel in the same way as the foreground signal is processed in the video channel. The transformed foreground signal provided by the video channel is combined with a synchronous background signal (FIG. 1(b)) in a background mixer 32 under control of the transformed crop signal. If a data word of the transformed crop signal has a value that represents a multiplication factor of one, the corresponding pixel of the foreground scene occludes the background scene, whereas if it represents a multiplication factor of zero, the corresponding pixel of the foreground scene is transparent and does not contribute to the composite scene.

The output signal of the background mixer 32 is applied to a digital-to-analog converter (DAC) and blanking inserter 33, and an analog component video signal representing the composite scene is thereby provided.

The crop signal is generated by a crop signal generator 38, which is controlled by the user through the operator interface 19. The crop generator generates an array of 720×480 data values. Typically, the data values are decimal 1024 for points inside the boundary of the geometrical figure defined by the crop signal and are decimal 0 for other points. Accordingly, along a line of the raster the crop signal may be represented as shown by the waveform A in FIG. 3. The user may adjust the size and shape of the geometrical figure in known manner. The crop signal provided by the crop generator 38 is applied to the key channel by way of multipliers 46 and 48 and a filter 36, the effects of which will be described below. For present purposes, it will be assumed that the multipliers 46 and 48 each apply a multiplication factor of 1.0, and that therefore the crop signal is not affected by the multipliers.

In the event that the transform carried out on the foreground signal involves a compression, the reverse address generator 18 selects a limited array of words from the video frame buffer and a correspondingly limited array of words from the key frame buffer. This results in an increase in the spatial frequency of the signal read from the video frame buffer. Therefore a filter selector 40 receives the signal from the operator interface 19 indicating the nature of the transform and, if the transformation is a compression, provides a command to the filter 34 to carry out a filtering operation that will ensure that the spatial frequency of the spatially-compressed output signal is no more than half the spatial sampling frequency. In general, the sampling frequency is not the same in the vertical direction as in the horizontal direction, and therefore the filter 34 carries out different filtering operations in the horizontal and vertical directions.

Figure 3:
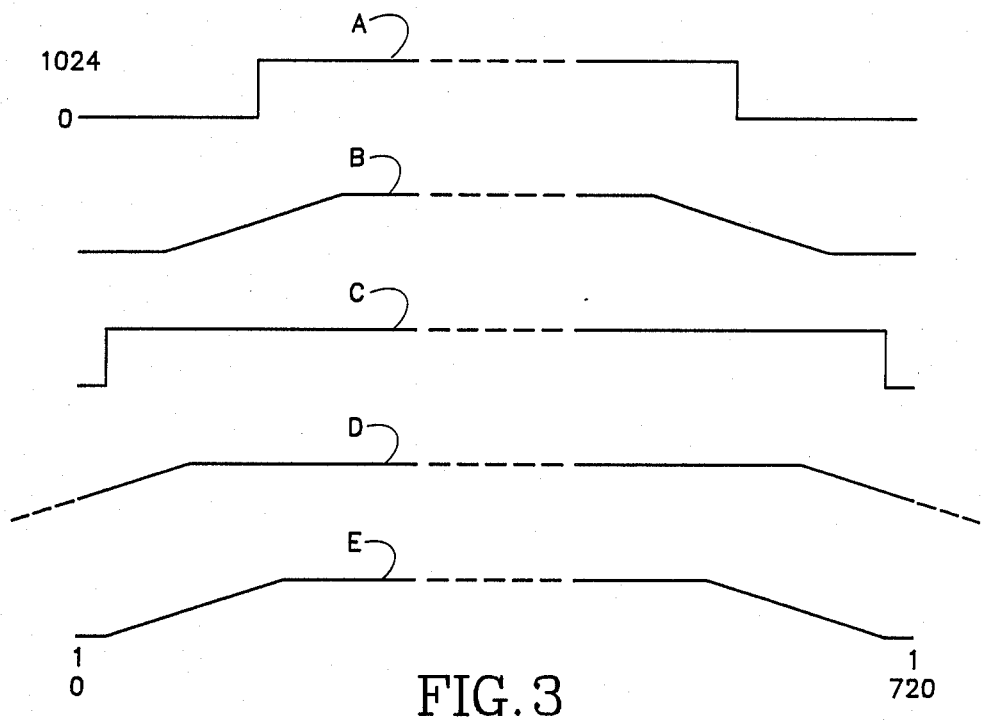
FIG. 3 illustrates waveforms useful in explaining the problem underlying the invention and the manner in which it is solved.

Since the foreground signal is both compressed and bandwidth-limited, the crop signal also is both compressed and bandwidth-limited. The bandwidth-limiting of the crop signal is accomplished using the filter 36, which carries out the same filtering operation as the filter 34. The filtering operation results in the change in the value of the crop signal from decimal 1024 to decimal 0 (or vice versa) not taking place in a single clock interval, as in the case of the waveform A, but over a ramp which is of non-zero length. The ramp might be linear, as shown by the waveform B, or it might, for example, be S-shaped, depending on the nature of the filtering operation. As shown in FIG. 3, for a linear ramp (waveform B) the 50% point of the ramp is at the position of the step-form change in the level of the original (unfiltered) crop signal (waveform A).

Figure 4:
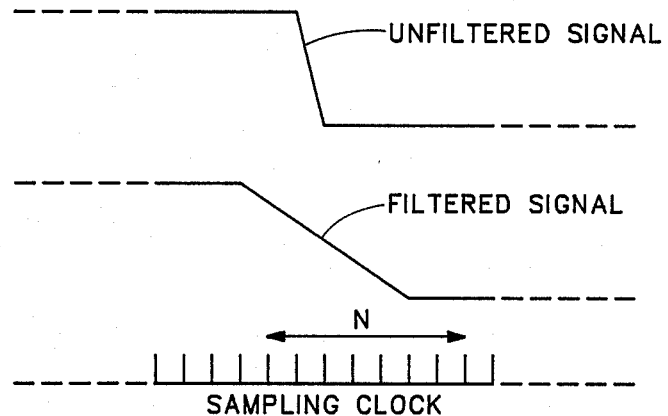
FIG. 4 illustrates waveforms used in explaining the concept of the step response of a filter.

For any bandwidth-limiting filtering operation that is carried out on a sampled signal, a step response N can be measured by applying a step-form input signal to the filter. As shown in FIG. 4, the step response is one less than the number of samples between the last data value of the output signal that occurs before the change and is the same as the corresponding data value of the input signal and the first data value of the output signal that occurs after the change and is the same as the corresponding data value of the input signal. The step response is thus a measure of the length of the ramp produced by the filter. The step response is the same for rising and falling changes. Therefore, at the rising ramp there is a run length of M samples between the last zero-valued sample before the ramp and the 50% point, where M is the next integer higher than N/2, and at the falling edge there is a run length of M samples between the 50% point and the first zero-valued sample after the ramp. Since different filtering operations are carried out in the vertical and horizontal directions, the step responses in the two directions are different, and therefore the run length $M_V$ in the vertical direction is different from the run length $M_H$ in the horizontal direction.

Figure 5:
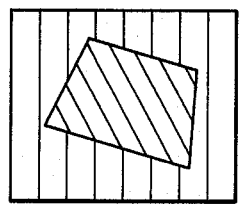
FIG. 5 illustrates how a composite scene formed from a differentially-compressed foreground can be used to simulate a perspective effect.

In the Kaleidoscope digital video effects apparatus manufactured by The Grass Valley Group, Inc., the compression factor is variable over the scene represented by the foreground signal in order to allow perspective views to be simulated as shown in FIG. 5. The nature of the filtering then changes as a function of position over the first scene, with the result that the filtering of the crop signal changes over its domain. Accordingly, the horizontal and vertical run lengths may be different in the four corners of the picture.

Figure 1E:
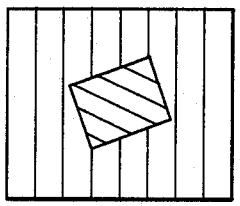

If the vertical boundary of the crop area is closer than $M_H$ to the left or right edge of the active picture area, or the horizontal boundary of the crop area is closer than $M_V$ to the top or bottom edge of the active picture area, the ramp in the crop signal will be truncated by the limit of the address space of the frame buffer, as shown by the waveforms C and D in FIG. 3. Truncation of the ramp introduces high-frequency components into the crop signal, and these lead to jaggies along the boundary between the foreground and background when the foreground and background signals are combined under control of the crop signal. These jaggies do not occur if the area of the foreground is small enough that the ramps are not truncated. The jaggies are rendered more noticeable if the boundary of the crop area is oblique to the raster lines of the composite scene. As shown in FIG. 1(e), the boundary of the crop area may be oblique to the raster lines if the crop area is rectangular and is oriented with its edges oblique to the raster lines. This may occur if the crop area prior to transformation has its edges parallel to the edges of the scene but the transformation involves not only compression but also rotation.

In the apparatus shown in FIG. 2, the jaggies are eliminated by limiting the size of the crop area so that truncation of the crop signal is avoided. In particular, the commands that are applied to the filters 34 and 36 and define the vertical and horizontal filtering operations that are to be employed in association with the compression, are applied to a look-up table 42. The look-up table returns four pairs of numbers which represent, for the four corners of the picture respectively, the next integer higher than half the step response of the filter in the vertical direction and the next integer higher than half the step response of the filter in the horizontal direction, i.e., $M_V$ and $M_H$ for the four corners. These numbers are applied to a crop limit generator 44, which uses these numbers to define a crop limit quadrilateral beyond which the crop area must not extend.

The crop limit generator 44 generates a signal which divides the domain of the crop signal into two regions. This is done by use of four plane generators 50, each of which implements the general equation for a plane:

$$Z = AX + BY + C \qquad (1)$$

If the image screen is considered to be at the plane $Z=0$, the plane $Z=AX+BY+C$ intersects the image screen along a line $AX+BY+C=0$. A determination as to whether a point in the plane $Z=0$ is on one side of the line or the other can be made by determining the value of Z returned by the plane equation for the coordinates of that point.

Each of the plane generators 50 receives a set of coefficients A, B and C and generates values of Z. The coefficients are calculated by a processor 52 from the values of $M_V$ and $M_H$. Consider, for example, the plane generator 50L which limits the crop area at the left side of the image screen, and assume that the horizontal step response of the filter 36 is 16 pixels for the upper left corner of the picture and 30 pixels for the lower left corner, giving run lengths of 9 and 16 respectively. Suppose also that the origin is taken to be at the upper left corner of the picture and that values of X and Y increase to the right and downwards respectively. Then, the line defining the left edge of the crop limit quadrilateral should pass through the points (9,0) and (16,480). The parameters A and B for the plane that intersects the Z=0 plane in this intersection line can be chosen by using the equations:

$$9A + 0B + C = 0 \quad (2)$$

$$16A + 480B + C = 0 \quad (3)$$

Subtracting (3) from (2) gives $$7A = 480B.$$

The sign of A determines the slope of the intersection plane relative to the plane Z=0. If A is positive, the value of Z returned by Equation (1) will be negative for points in the plane Z=0 that are to the left of the intersection line and positive for points to the right of the intersection line. The value of A is chosen to suit hardware convenience. Once A has been chosen, values of B and C can be calculated. Values of A, B and C for the other plane generators are derived in similar fashion. If the values of A for the plane generators 50L and 50R are positive and negative respectively and the values of B for the plane generators 50T and 50B are positive and negative respectively, for each plane generator the value of Z returned for a point between the intersection line and the adjacent edge of the field is negative and for other points the value of Z is positive. The output signal Z of each plane generator is applied to a clip and gain circuit 54 which provides an output signal representing logical 1 for Z>0 and logical 0 for Z<0, and the output signals of the four clip and gain circuits are multiplied using the logical AND operator. The result is a crop limit signal comprising an array of 720×480 data values, with values inside the quadrilateral defined by the four planes being logical 1 and values outside this quadrilateral being logical 0.

It will be understood by those skilled in the art that the crop limit generator operates in analogous fashion to a wipe signal generator, with the four planes generating a wipe solid.

The crop limit signal is applied to the multiplier 46, which may be simply a gating circuit, and the output signal provided by the multiplier 46 is the crop signal provided by the crop generator 38, trimmed in accordance with the crop limit signal so that it is decimal 0 outside the quadrilateral defined by the four planes. Therefore, as shown by the waveform E in FIG. 3, the sample values at the periphery of the domain of the trimmed crop signal are all zero and the trimmed crop signal is not truncated. Consequently, the jaggies at the boundary between the foreground and background of the composite scene are eliminated.

The multiplier 48 receives a signal provided by a switch 56 as its second input. In one position, the switch 56 provides a logical 1, and accordingly the multiplier does not affect the output signal provided by the multiplier 46. The crop signal provided by the crop generator 38, trimmed in accordance with the crop limit signal, is filtered and transformed and is used to control combination of the foreground and background signals.

In its other position, the switch 56 provides an external key signal which may be used to further limit the trimmed crop signal. For example, if the background scene is a solid matte, the external key signal might be used to insert titles into the composite scene. In this casae, the combination of the trimmed crop signal and the key signal is filtered and transformed and used to control combination of the foreground and background signals.

The effect of moving the boundary of the crop area is not disturbing to the viewer of the composite scene because the amount by which the boundary is moved depends upon the amount of compression that will take place, and when compression of the first scene occurs the amount by which the boundary moves, as seen in the output scene, is reduced in accordance with the compression factor.

It will be appreciated that the present invention is not restricted to the particular embodiment that has been described, and that variations may be made therein without departing from the scope of the invention as defined in the appended claims and equivalents thereof. For example, the invention is not restricted to use with a reverse transform system and is also applicable to a forward transform system so long as the crop signal is transformed with the foreground signal. The invention is not restricted to the crop area defined by the crop generator being rectangular, or to any specific values of the crop signal corresponding to specific multiplication factors. The invention may be applied to signals in other forms than luminance and chrominance components.

I claim:

1. A method of processing first sequence of sample values, data values representing a second sequence of sample values, and a third sequence of sample values, the first, second and third sequences containing equal numbers of sample values, comprising:
    (a) selecting a low-pass filtering operation to be carried out on the first sequence,
    (b) modifying the data values representing the second sequence so as to provide data values representing a fourth sequence of sample values, such that when the selected low-pass filtering operation is carried out on the fourth sequence to provide a fifth sequence, the sample values at the limit of the domain of the fifth sequence are all zero-valued,
    (c) carrying out the selected low-pass filtering operation on the first and fourth sequences, to provide a sixth sequence and said fifth sequence respectively,
    (d) multiplicatively combining each sample value of the fifth sequence with one of the corresponding sample value of the sixth sequence,
    (e) multiplicatively combining the complement of each sample value of the fifth sequence with the corresponding sample value of the third sequence, and
    (f) additively combining the values returned by steps (d) and (e).

2. A method according to claim 1, further comprising, between steps (c) and (d), carrying out a spatial transform operation on the fifth sequence and the sixth sequence, the low-pass filtering operation carried out in step (c) being dependent on the nature of the transform operation.

3. A method of processing first and second coextensive two-dimensional arrays of sample values, comprising:

(a) selecting a low-pass filtering operation to be carried out on the first array,
(b) modifying the second array to provide a third array, such that when the selected low-pass filtering operation is carried out on the third array to provide a fourth array, the sample values about the periphery of the domain of the fourth array are all zero-valued,
(c) carrying out the selected low-pass filtering operation on the first and third arrays to provide a fifth array and said fourth array respectively,
(d) multiplicatively combining each sample value of the fourth array with one of the corresponding sample value of the fifth array,
(e) multiplicatively combining the complement of each sample value of the fourth array with the corresponding sample value of the third signal, and
(f) additively combining the values returned by steps (d) and (e).

4. A method according to claim 3, wherein the first array of sample values is formed by sampling a first continuous video signal and the third signal is a sampled signal formed by sampling a second continuous video signal.

5. A method according to claim 4, wherein the domain of the first array is substantially coextensive with the active intervals of the active lines of the first continuous video signal.

6. Apparatus for processing first, second and third sequences of sample values, comprising:
means for forming first and second coextensive arrays of sample values from the first and second sequences respectively,
means for selecting a low-pass filtering operation to be carried out on the first array,
means for modifying the second array to provide a third array, such that whan a second low-pass filtering operation is carried out on the third array to provide a fourth array, sample values at the limit of the domain of the fourth array are all zero-valued,
low-pass filter means for carrying out the selected low-pass filtering operation on the first and third arrays to provide a fifth array and said fourth array respectively,
multiplication means for multiplicatively combining each sample value of the fourth array with one of the corresponding sample value of the fifth array and for multiplicatively combining the complement of each sample value of the fourth array with the corresponding sample value of the third sequence, and
addition means for additively combining the values provided by the multiplication means.

7. Apparatus according to claim 6, comprising transform means for carrying out a spatial transform operation on the fourth and fifth arrays.

* * * * *